Nov. 10, 1970   C. H. BOYD   3,539,918
SYSTEM FOR SELECTIVELY CONNECTING AN ELECTRICAL
DEVICE TO A TEST SET
Filed April 29, 1968
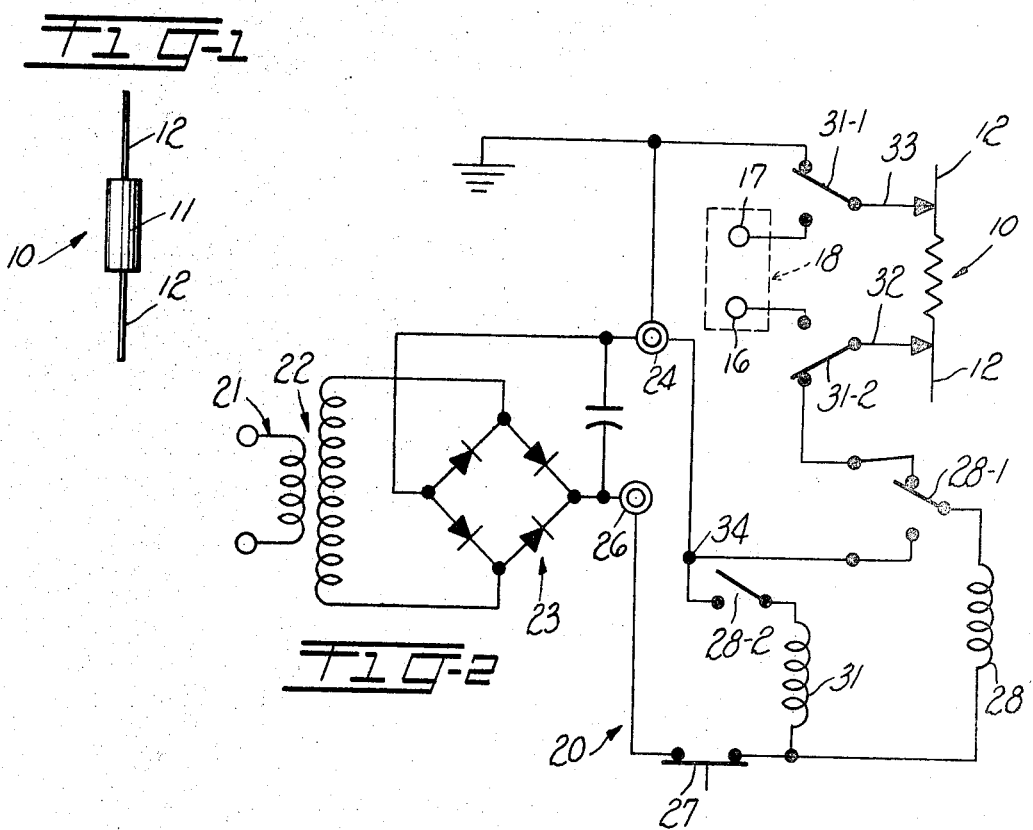
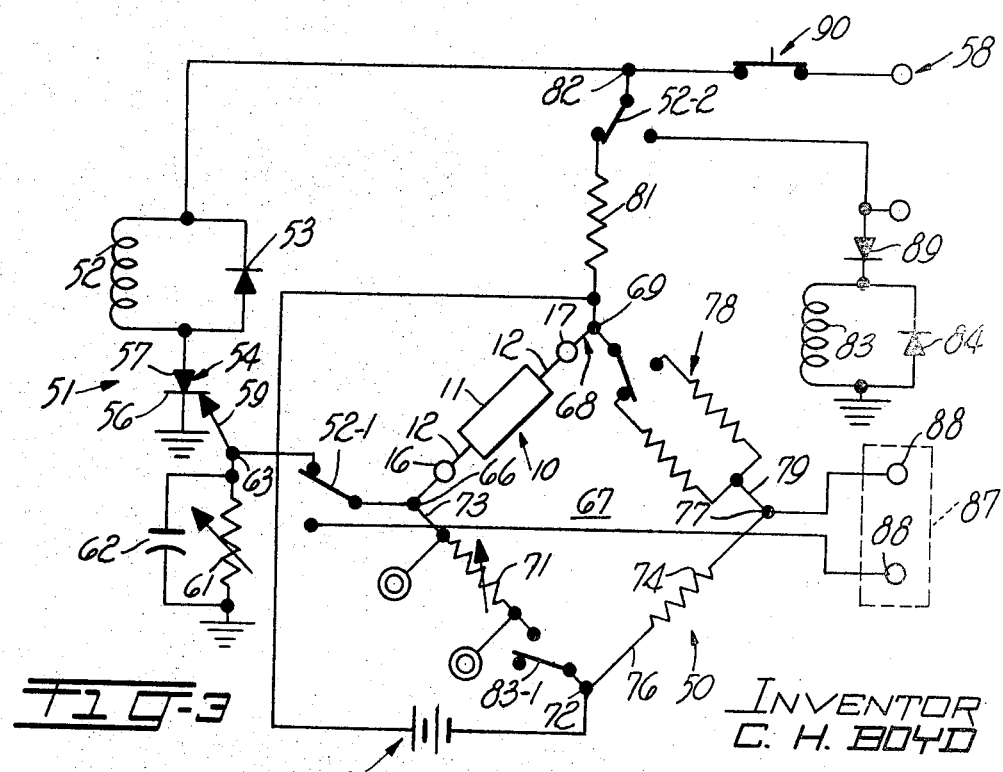
INVENTOR
C. H. BOYD
BY R. P. Miller
ATTORNEY

United States Patent Office 3,539,918
Patented Nov. 10, 1970

3,539,918
SYSTEM FOR SELECTIVELY CONNECTING AN ELECTRICAL DEVICE TO A TEST SET
Charles H. Boyd, Winston-Salem, N.C., assignor to Western Electric Company, Incorporated, New York, N.Y., a corporation of New York
Filed Apr. 29, 1968, Ser. No. 724,878
Int. Cl. G01r 27/02
U.S. Cl. 324—62
8 Claims

ABSTRACT OF THE DISCLOSURE

Circuits include a silicon-controlled rectifier, or other selectively operated devices, which are triggered by current through a resistor placed in testing terminals to operate a relay and connect a measuring bridge circuit to the resistor.

BACKGROUND OF THE INVENTION

Field of the invention

This invention relates to a system for selectively connecting an electrical device to a test set and more particularly, to a circuit for sensing the presence of a resistor in an automatic resistor measuring station to actuate a switching device which initiates operation of a measuring circuit.

Description of the prior art

It is desirable that, in any automatic resistor measuring apparatus, provision should be made for sensing the presence of a resistor which is to be electrically measured. Generally, this has been accomplished by using a low pressure actuated snap-action switch which is operated either by the resistor body or lead wire of the resistor. Operation by the lead wire is more often than not unreliable because of the tendency of the lead wire to bend when the lead wire contacts the switch actuator. On the other hand, operation of the switch by the resistor body is also somewhat unreliable for resistors having small body diameters on the order of 1/16 of an inch.

Moreover, the differential between the operate point and the release point of typical switches is generally on the order of a magnitude of 0.05 inch. While special short throw switches are available commercially, the actuating force required for these switches is generally quite high. This is undesirable because a varnish coating on a resistor may be damaged when it is forceably used to operate the switch. This is especially bad since the quality of the film or coating is directly related to the moisture resistance of the resistor. Therefore, it is undesirable to abrade or otherwise damage this coating.

It is possible by careful design and intricate details to overcome the limitations mentioned hereinbefore and to sense the presence of a small diameter resistor by using a commercially-available switch. In some cases, however, the mechanical design does not lend itself to the installation of a sensing switch at the precise location where the measurement is to occur. Of course, one solution to this is to sense the presence of the resistor at some point ahead of the measuring location; but this would require the installation of some type of memory, such as a shift register, to perform the actual measurement on the resistor after the resistor is moved into the measuring location. Apparently because of the complexities of this circuit, it is not widely used.

SUMMARY OF THE INVENTION

It is, therefore, an object of this invention to provide a system for selectively connecting an electrical device or component to a test set.

Perhaps the best solution to the problem presented is to sense the presence of the resistor across unknown terminals of a measuring bridge by some electrical device. Then when the resistor is moved into position to be measured, a sensing circuit may be completed which operates appropriate relays to establish the measuring circuit. On the other hand, when no resistor is present, the sensing circuit is not activated and no electrical measurement is performed.

It is, therefore, an object of this invention to provide a resistor sensing circuit which is completed when a resistor is moved into a test station to connect the resistor into a measurement circuit.

It is also an object of this invention to provide a circuit for enabling a normally disabled bridge measuring circuit upon insertion of a component to be measured in one arm of a bridge connected to said measuring circuit.

It is important that a sensing circuit constructed to perform the hereinbefore mentioned operations meet several stringent requirements. Firstly, the circuit must be capable of accommodating resistors which have resistance values in a widely diverse range, for example, from 50 ohms to 261,000 ohms. Moreover, the circuit must also be capable of disconnection from the resistor under test and must establish memory for indicating that a test is to be made. Lastly, the sensing is desirably automatic with no attention required from an operator and without regard to the resistance value of the particular resistor under test; that is, providing the value is within the design range of the circuit.

With these and other objects in mind, the present invention contemplates a system for selectively connecting an electrical component to a test set which includes a control device that is triggered by current through the component at the testing station to connect a bridge measuring circuit to the component to measure and evaluate an electrical characteristic thereof. More particularly, a resistor sensing cricuit is established for sensing the presence of a resistor in an automatic test station to control the operation of a measuring circuit. The sensing circuit includes a silicon conrtol rectifier or other control device which is triggered by current through a circuit which has been completed through a pair of switching contacts when the resistor is positioned within the testing station. The triggering of the silicon control rectifier or other control device energizes a normally unoperated switching relay for moving the switching contacts from the control device to connect the resistor to the measuring circuit to measure the resistance.

Other objects and advantages of the present invention will be apparent from the following detailed description when considered in conjunction with the accompanying drawing.

BRIEF DESCRIPTION OF THE DRAWINGS

FIG. 1 is a view of an electrical device, for example, a resistor which is to be tested and electrically measured in a circuit which embodies the principles of this invention;

FIG. 2 is a schematic drawing of a resistor sensing circuit which may be used to practice the principles of this invention and to detect the presence of a resistor or other electrical component and then connect the resistor to a test circuit;

FIG. 3 is a schematic drawing of another embodiment and showing another electrical circuit which may be used to sense the presence of a resistor in a bridge measuring apparatus and to selectively connect the resistor to the bridge measuring apparatus.

DETAILED DESCRIPTION

Referring now to FIG 1, there is shown an electrical component, such as a resistor, designated generally by the numerals 10, and having a body portion 11 and leads 12 extending axially therefrom. A plurality of resistors 10 are to be measured for electrical properties by connecting individually each of the resistors to a pair of terminals 16 and 17 in a measuring, or testing, apparatus, such as a resistance measuring bridge circuit, designated generally by the numerals 18, with one of the leads 12 connected to terminal 16 and the other lead 12 connected with terminal 17 (see FIG. 2).

Referring now to one embodiment of the invention in FIG. 2 there is shown a resistor sensing circuit, designated generally by the numerals 20, which may be used to connect the leads 12 of the resistor 10 which is to be measured to the terminals 16 and 17.

The resistor sensing circuit 20 is supplied from a source 21 of alternating current which is connected across a transformer, designated generally by the numerals 22, to a bridge rectifier 23 to supply a DC output across a pair of terminals, or junction points, 24 and 26.

The terminal 26 is connected through a normally closed reset switch 27 and a control relay 28 and a normally unoperated, make-before-break contacts 28–1 to a pair of switching contacts 31–2 of a switching relay 31 and then to a measuring probe or lead receiving socket 32. A second measuring probe 33, or lead receiving socket, is connected through a pair of normally closed switching contacts 31–1 to the terminal 24. The relay 31 is connected in parallel across the junction points 24 and 26 and energized when a pair of normally unoperated contacts 28–2 of control relay 28 are closed.

When the switching contacts 31–2 are operated by the energization of the relay 31, the one lead 12 of the resistor 10 is connected through the measuring probe 32 to the terminal 16 of the bridge measuring circuit 18. Similarly, when the contacts 31–1 are opened by the energization of the relay 31, the other lead 12 of the resistor 10 is connected through the second measuring probe 33 to the terminal 17 of the bridge measuring circuit 18.

Moreover, the energization of relay 28 operates a contactor of make-before-break contacts 28–1. When the contactor of make-before-break contacts 28–1 engages the lower contact, a circuit is completed from junction point 26 through now-closed switch 27, relay 28, contactor and lower contacts of the make-before-break contacts 28–1 and junction point 34 back to junction point 24 to hold the relay 28 locked in an energized condition. Moreover, after the lower contacts of the make-before-break contacts 28–1 have been operated, the upper contact is de-energized to disconnect the relay 28 from the switching contacts 31–1 and 31–2 and the electrical component 10.

In the operation of the resistor sensing circuit 20, a resistor 10 of unknown value is positioned at the test station with the leads 12 in engagement with the measuring probes 32 and 33. The current output from the source 21 and bridge rectifier 23 to the junction points or terminals 24 and 26 is applied through a now-completed circuit through now-closed reset switch 27, relay 28, normally closed upper contacts 28–1 and switching contacts 31–2, the measuring probe 32 and resistor 10 and then back through the measuring probe 33 and switching contacts 31–1 to the junction point 24.

The current through this circuit energizes relay 28 to indicate the presence of a resistor ready for testing. The energization of the control relay 28 operates make-before-break contacts 28–1 to complete a circuit through junction point 34 and to operate contacts 28–2 to connect the switching relay 31 across the terminals 24 and 26.

When the switching relay 31 is energized, contacts 31–1 and 31–2 are switched to disconnect the resistor sensing circuit 20 from the resistor 10. The resistor 10 is connected through the probes 32 and 33 and now-operated contacts 31–1 and 31–2 to the terminals 16 and 17, respectively.

The resistor 10 is now operatively connected through the terminals 16 and 17 into the bridge measuring circuit 18 (FIG. 2). After the resistance value of the resistor 10 has been determined, the resistor 10 is removed from engagement with the measuring probes 32 and 33. Then the reset switch 27 is opened, either manually or otherwise (e.g., by the removal of the resistor) to de-energize relay 28 and switching relay 31, which releases switching contacts 31–1 and 31–2 to disconnect the probes 32 and 33 from the bridge measuring terminals 16 and 17 and recondition the circuit for another cycle of operation.

In an alternative embodiment (see FIG. 3), provisions are made to test resistors which may have a much broader range of resistance values. This is accomplished by employing a silicon-controlled rectifier in the resistor sensing circuit in place of a relay for triggering the sensing circuit and connecting the resistor 10 to a bridge measuring circuit 50.

As can be seen in FIG. 3, there is shown a sensing circuit, designated generally by the numerals 51, and which includes a switching relay 52 and a diode 53 connected in parallel and then serially through a silicon-controlled rectifier, designated generally by the numerals 54, to ground.

The silicon-controlled rectifier 54 is a commercially available device and may be a two-state semi-conductor device having thyratron-like operating characteristics. This silicon-controlled rectifier 54, which is normally in a nonconductive state, includes a cathode 56 and an anode 57, the latter of which is biased in a forward direction by suitable external means such as a positive voltage source 58. The silicon-controlled rectifier 54 is further provided with a control electrode 59 which is effective, when suitably energized, by biasing potential to place the device in a conductive state.

The control electrode 59 of the silicon-controlled rectifier 54 is connected to a parallel resistor 61-capacitor 62 network. The control electrode 59 is also connected through a junction point 63 to a pair of normally unoperated switching contacts 52–1 and then through the contacts to a junction point 66 of a four-arm measuring bridge, designated generally by the numerals 67.

In the measuring bridge 67, the unknown resistor 10 is positioned with the leads 12 of the resistor in engagement with clip terminals 16 and 17 in a first arm 68 of the bridge between the junction point 66 and a junction point 69. A calibrated, adjustable balancing resistor 71 is connected between the junction point 66 and a junction point 72 of a second arm 73 of the bridge 67. A fixed resistor 74 is connected into a third arm 76 of the bridge between the junction point 72 and a junction point 77. Finally, a resistor bank, designated generally by the numerals 78, is connected between the junction points 69 and 77 in a fourth arm 79 of the measuring bridge 67.

The positive source 58 of DC potential is connected through a junction point 82 to the switching relay 52 and diode 53 to the anode 57 of the silicon-controlled rectifier 54. The DC potential source 58 is also connected through the junction point 82 and through a second pair of switching contacts 52–2, associated with the relay 52, now normally unoperated and through a resistor 81 to the junction point 69. When the relay 52 is energized to operate the switching contacts 52–2, the source 58 applies current through the contacts 52–2 to a bridge enabling or operating relay 83 and then to ground. The relay 83 is connected in parallel with a diode 84 which provides a bypass for residual current, thus, reducing electrical arcing across the contacts 52–2 which is caused by the collapsing magnetic field when the relay 83 is de-energized.

The operating circuit for the measuring bridge 67 is not complete because a pair of normally-open bridge enabling or operating contacts 83–1 associated with the bridge enabling relay 83 is positioned in the second arm 71 of the bridge. The second arm 71 of the bridge 67 is complete when the contacts 83–1 are operated by the energization of the bridge enabling relay 83. A source 86 of voltage is connected across the bridge 67 to junction points 69 and 72 to supply constant voltage for the measuring circuit. A null detector, designated generally by the numerals 87, for the bridge is connected to terminals 88 which in turn are connected respectively to junction 77 and through switching contacts 52–1 to junction 66.

In operation, an unknown resistor 10, or other electrical device to be checked, is placed in the bridge so that one of the leads 12 engages the terminal 16 and the other lead engages the terminal 17. Initially, the silicon-controlled rectifier 54 is nonconductive. A positive potential is applied from the source 58 through the contacts 52–2, resistor 81, the unknown resistor 10 and then through now-unoperated contacts 52–1 to the control electrode 59 of the silicon-controlled rectifier 54. The value of the potential impressed through junction 63 and on the control electrode 59 is set by the voltage divider effect provided by resistor 81, the test resistor 10, connected through junction 63 to grounded resistor 61.

The potential applied to the control electrode 59 triggers the silicon-controlled rectifier 54 to a conductive state. When the silicon-controlled rectifier 54 is rendered conductive, an electrical circuit is completed from the source 58 through the switching relay 52 and then through the now-conductive silicon-controlled rectifier to ground to energize the switching relay.

When the switching relay 52 is energized, the normally unoperated contacts 52–1 are operated to complete a circuit from the bridge 67 through the junction points 66 and 77 to a calibrated measuring device such as the null detector, designated generally by the numerals 87. As the contacts 52–2 are operated, the source 58 of DC current is disconnected from the sensing circuit 51 and is operatively connected through a diode 89 to the bridge enabling relay 83 and to ground. The switching of contacts 52–1 and 52–2 removes the triggering potential from the control electrode 59 of the silicon-controlled rectifier 54, but the rectifier continues to conduct to maintain switching relay 52 energized.

The energization of the bridge enabling relay 83 energizes bridge enabling contacts 83–1 in the second arm 71 of the measuring bridge 67 to complete the bridge circuitry and enable the bridge circuit 50 to respond to the resistance value of the resistor 10. It is apparent that the bridge circuit 50 is not completed until the sensing circuit 51 has been effectively disconnected from the resistor 10 thereby insuring that the bridge cannot be enabled until a resistor 10 has been placed in the first arm 68 of the bridge 67.

With the operation of the bridge enabling contacts 83–1, the bridge 67 is now in condition to measure the resistance value of the resistor 10. An operator varies the balancing resistor 71 in the second arm 73 of the bridge 67 until a null is detected by the calibrated measuring device 87, whereupon a reading of the resistance value of the resistor is taken.

After the test of the resistor 10 has been completed, the holding current through the bridge enabling relay 83 is interrupted by the opening of a reset switch 90 to de-energize the bridge enabling relay and switch the contacts 83–1, to interrupt current flow in the arm 73 of the bridge 67. The opening of the reset switch 90 interrupts the circuit from the anode 57 of the silicon-controlled rectifier 54 to the source 58. The interruption of the circuit from the anode 57 to the source 58 interrupts the holding current on the switching relay 52 to de-energize the relay and return the contacts 52–1 and 52–2 to an initial position, as shown in FIG. 3. Moreover, forward bias on the silicon-controlled rectifier 54 is removed to render the silicon-controlled rectifier nonconductive and return the control thereof to the control electrode 59. The leads 12 are disengaged from the terminals 16 and 17 and the resistor is removed from the bridge 67.

When the switching contacts 52–1 and 52–2 are returned to an initial position, the measuring circuit 50 is disconnected and the sensing circuit 50 is now in condition for another cycle of operation when the next successive resistor is placed between the terminals 16 and 17.

When the current is disconnected from switching relay 52 and bridge enabling relay 83, currents due to the collapse of the fields in the relay coils are rapidly dissipated in the parallel branch of the circuit through the diodes 53 and 84, respectively, to reduce electrical noise voltage that is generated by the collapse of the fields and protect contacts 52–2 and the silicon-controlled rectifier 54 from damage.

Use of the sensing circuits 51 in conjunction with the bridge enabling relay 83 insures that a resistor 10 is in place before the testing can commence. If the resistor is so defective as to place a high resistance value in the circuit, then the potential applied at junction point 66 will be insufficient to trigger the silicon-controlled rectifier 54. This situation would immediately indicate to the attending operator that the resistor is defective.

It is to be understood that the above-identified embodiments are simply illustrative of the principles of the invention and numerous other modifications may be devised without departing from the spirit and scope of the invention.

What is claimed is:

1. In a system for selectively connecting an electrical device to a test set:

a pair of switching contact means connectable to the electrical device and operable to connect the electrical device to the test set;

control means connected to said pair of switching contact means for sensing a connection of the electrical device to said contact means;

a normally deenergized switching relay decoupled from said control means for operating the switching contact means;

means responsive to the connection of the electrical device to said switching contact means for energizing said control means; and means operated by the energization of said control means for energizing said switching relay to operate said contact means.

2. In an apparatus which includes an electrical measuring bridge for testing resistors, the improvement to which includes a circuit for sensing the presence of a resistor and for then operatively connecting the resistor through a pair of terminal to the bridge:

a pair of spaced probes;

a first relay normally disconnected from said circuit;

normally unoperated contacts associated with said first relay for connecting said probes to said terminals;

a second relay connected through said normally unoperated contacts to said probes and having normally unoperated contacts for connecting said first relay into said circuit in energized relation; and means responsive to the engaging of said probes by a resistor for energizing said second relay to operate said contacts associated with said second relay to energize said first relay, thereby operating said contacts associated with said first relay to connect said probes to said terminals.

3. In a circuit for selectively connecting a component to a test set having a pair of test terminals:

a pair of support terminal means for receiving said component;

a first relay circuit having make-before-break contacts;

a second relay circuit connected to said make-before-break contacts having a pair of switching contacts for selectively connecting said test terminals to said support terminal means;

means normally connecting the second relay contacts to said make-before-break contacts; and means responsive to the presence of said component in said terminal support means and connected through said make-before-break contacts for sequentially energizing said first relay to operate said make-before-break contacts to operate said switching contacts to connect said component to said test terminals.

4. In a system for selectively connecting an electrical device placed in a first arm of a bridge to a test set:

normally unoperated switching means connectable to said electrical device;

a control means connected through said electrical device and said switching means for operating said switching means to connect said electrical device to said test set;

means responsive to the connection of said electrical device to said switching means for energizing said control means;

normally unoperated means in a second arm of said bridge for enabling said bridge; and means rendered effective by the operation of said switching means for operating said normally unoperated means.

5. In a test set for measuring an electrical characteristic of an electrical device which has been placed in engagement with a pair of terminals in a first arm of a four-arm bridge;

a pair of switching contact means connectable to the electrical device;

normally open relay contacts in a second arm of said bridge for completing said bridge;

thyratron-like control means having a control electrode;

a bridge enabling relay for closing the contacts in said second arm of said bridge;

means responsive to the connection of an electrical device in engagement with said terminals for energizing said control electrode and operating said thyratron-like control means; and a switching relay rendered effective by the thyratron control means for moving the switching contacts from the control means to connect the bridge to said test set and for energizing said bridge enabling relay.

6. In a bridge circuit for measuring a component connected to a first arm of a four-arm bridge, the improvement comprising:

a bistable circuit for selectively connecting the component to the bridge circuit which includes;

an electronic switch device, having an anode, a cathode and a gating electrode, characterized in that a trigger potential applied to the gating electrode switches the device into a conducting state when biased in a forward direction by a supply potential, the gating electrode thereafter relinquishing control until said device returns to a nonconducting state upon removal of the supply potential from the anode;

an energizing circuit operable when said electrical component is connected to the arm of the bridge for applying a trigger potential to the gating electrode to switch the device into a conducting state;

means responsive to the switching of said device to a conducting state for connecting said component to said bridge circuit;

normally unoperated means in a second arm of said four-arm bridge for completing said bridge circuit; and means energized when said component is connected to said bridge circuit for operating said normally unoperated means.

7. In a system for placing an electrical device in a first arm of a four-arm bridge and for then selectively connecting the electrical device in a bridge measuring circuit;

a semi-conductor switching device having an anode, a cathode and a gating electrode, characterized in that a trigger potential applied to the gating electrode switches the device into a conducting state when biased in a forward direction by a supply potential, the gating electrode thereafter relinquishing control until said device returns to a nonconducting state upon removal of the supply potential from the anode;

a normally unoperated switching relay having a pair of switching contacts connectable to the electrical device;

an energizing circuit;

means connected to said energizing circuit and responsive to the connection of an electrical device to said first arm of said bridge for triggering said gating electrode to operate said semi-conductor switching device and to energize said switching relay;

means normally unoperated for completing said bridge measuring circuit; and means responsive to the switching of said switching contacts for operating said normally unoperated means.

8. In a bridge circuit including a four-arm bridge for measuring a resistor, the improvement comprising:

a bistable circuit for sensing the presence of a resistor which includes:

a silicon-controlled rectifier having an anode, a cathode and a gating electrode, wherein a trigger potential applied to the gating electrode initiates conductance between the anode and cathode when biased in the forward direction;

a switching relay having an operating winding connected to said anode;

an energizing circuit connected to said operating winding and through a resistor placed in a first arm of the four-arm bridge for triggering said gating electrode and for energizing said relay;

switching contact means operated by said relay winding for removing said resistor from said energizing circuit and for connecting said resistor to said bridge circuit whereupon said trigger potential is removed from said gating electrode;

normally open bridge enabling contacts in a second arm of said bridge for completing said bridge circuit;

means rendered effective by the operation of said switching contact means for closing said normally open bridge enabling contacts; and means connected in said energizing circuit for removing said forward bias and for de-energizing said switching relay and said bridge enabling relay to return said silicon-controlled rectifier to a nonconductive state and to return said switching contact means and said bridge enabling contacts to an initial condition in preparation for a subsequent test cycle.

References Cited

UNITED STATES PATENTS 3,119,063  1/1964  Brightman et al. _____ 340—255

J D MILLER, Primary Examiner

W. J. SMITH, Assistant Examiner

U.S. Cl. X.R.

179—175.12; 317—153, 155